(12) United States Patent
Browne et al.

(10) Patent No.: US 7,686,933 B2
(45) Date of Patent: Mar. 30, 2010

(54) METHOD AND APPARATUS FOR PURIFYING AN OIL-BASED FLUID

(75) Inventors: Neale Browne, Houston, TX (US); Catalin Ivan, Sugarland, TX (US); Zoran Markanovic, Halifax (CA)

(73) Assignee: M-I L.L.C., Houston, TX (US)

( * ) Notice: Subject to any disclaimer, the term of this patent is extended or adjusted under 35 U.S.C. 154(b) by 57 days.

(21) Appl. No.: 11/303,111

(22) Filed: Dec. 16, 2005

(65) Prior Publication Data

US 2006/0131247 A1    Jun. 22, 2006

Related U.S. Application Data

(60) Provisional application No. 60/638,631, filed on Dec. 22, 2004.

(51) Int. Cl.
   *C10G 32/02* (2006.01)
(52) U.S. Cl. .................. 204/513; 204/514; 204/649; 204/650; 204/669
(58) Field of Classification Search ................ 204/513, 204/514, 649, 650, 669
   See application file for complete search history.

(56) References Cited

U.S. PATENT DOCUMENTS

| 2,109,131 | A | * | 2/1938 | Fisher ........................ 204/560 |
| 3,825,484 | A | * | 7/1974 | Fronsman et al. ........... 204/216 |
| 4,305,797 | A |   | 12/1981 | Knoll et al. |
| 4,444,637 | A |   | 4/1984 | King |
| 5,399,249 | A | * | 3/1995 | Scheufler .................... 204/226 |

OTHER PUBLICATIONS

International Search Report issued on Feb. 9, 2007 for PCT/US05/45720, filed Dec. 16, 2005.
Written Opinion issued on Feb. 9, 2007 for PCT/US05/45720, filed Dec. 16, 2005.

* cited by examiner

*Primary Examiner*—Arun S Phasge

(57) ABSTRACT

An apparatus for electrophoretically removing contaminants from an oil-based drilling fluid includes a housing, a drum, a means for rotating the drum, and a scraper head. The drum is retained within the housing above the housing floor. The oil-based drilling fluid is directed along the housing floor, contacting both the housing floor and the drum. A negative charge is applied to the drum and a positive charge is applied to the housing, creating an electrical field through the fluid. Drilling fluid contaminants are attracted to and collect upon the drum outer surface. The means for rotating the drum turns the drum through the fluid and collected contaminants remain on the drum outer surface. The scraper removes the collected contaminants from the drum outer surface as it rotates. A method for removing contaminants from an oil-based drilling fluid includes directing the contaminated into the electrically charged housing, adjusting the drum height of the oppositely electrically charged drum so that it contacts the fluid, rotating the drum to remove the contaminants collected thereon from the fluid, and scraping the drum with a nonconductive scraper head to remove the contaminants.

23 Claims, 12 Drawing Sheets

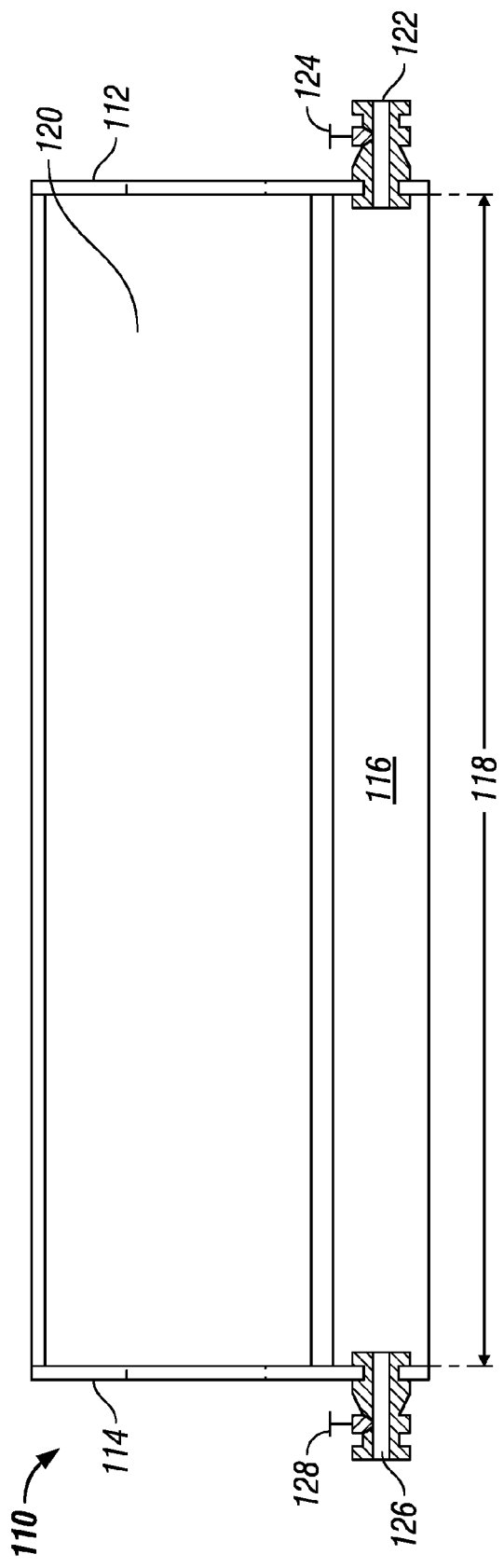
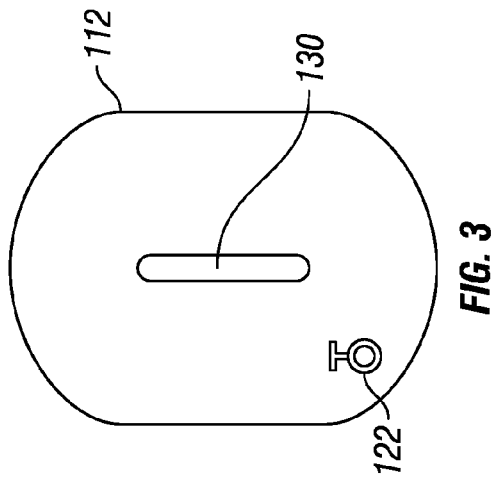

METHOD AND APPARATUS FOR PURIFYING AN OIL-BASED FLUID

This application claims priority to U.S. Provisional Patent Application 60/638,631 filed on Dec. 22, 2004 and entitled, "Method and Apparatus for Purifying an Oil-Based Fluid" incorporated herein by reference.

BACKGROUND OF INVENTION

When drilling oil and/or gas wells, oil-based drilling fluids are often used to cool the drill bit, remove rock chips, and control subsurface fluids. After being used, this fluid, known as drilling mud, contains undesirable solids. Before the mud can be used again, the solids must be removed.

Various devices are used to remove solids from drilling fluid. Large solids are often removed by passing the fluid through a vibrating porous membrane, or screen, and segregating the solids that are too large to pass through the screen. Centrifugal force may be used to remove finer solids from the drilling mud. However, ultra fine solids, i.e. those solids that are not removed from the fluid by mechanical means, such as vibratory separators and centrifuges, remain in the oil-based mud even after this processing. Continual re-use of the drilling fluid increases the amount of ultra fine solid contaminants present in the fluid.

These solids can affect many fluid system properties adversely. Formation clays are unavoidably incorporated into the fluid system, and depending on their nature and amount, the clay minerals can be beneficial or harmful to the fluid system. Contaminants, such as gypsum, can "cut" the fluid system causing particles to flocculate and the viscosity to increase. When this occurs, there is danger of torquing the drill pipe to the point of breakage or of causing a blowout. At high temperatures, gelation or thickening of the fluid can occur, leading to greatly increased pressure on the recirculation pump.

It would be an improvement to the art to be able to remove ultra fine solid contaminants from oil-based drilling fluid so that additional use of the drilling fluid is possible. One way to do this is through electrophoresis.

The application of an electric field to a solution will result in the migration of certain molecules in a particular direction. Positively charged molecules will migrate toward a negatively charged cathode while negatively charged molecules will migrate toward the positively charged anode. This process, known as electrophoresis, may be used to purify certain solutions.

Many electrophoresis devices include a positively charged electrode and a negatively charged electrode that are placed into a bath of solution, which is purified in a batch. Used drilling fluid may be treated in batches or continuously as the drilling operation progresses. Thus, it would be an improvement in the art to have an apparatus that provides continual ultra fine solids removal capability to a stream of such contaminated fluid. Such an apparatus can be used in series with other treatment apparatuses to remove contaminants from a stream of drilling fluid. It would also be an improvement to have an apparatus that can also remove ultra fine solids from a batch or store of drilling fluid.

While some electrophoresis devices include a scrubber for removing unwanted deposits on the anode, there is still a need for removing the contaminants that accumulate on the negatively charged cathode during a continuous treatment process.

SUMMARY

In one aspect, the claimed subject matter is generally directed to an apparatus for purifying an oil-based fluid. The apparatus includes an electrically charged housing through which a fluid stream may be directed and an oppositely charged rotatable drum retained within the housing such that the drum outer surface contacts the fluid in the housing. A nonconductive scraper head contacts the drum outer surface and removes collected material from the drum outer surface as the drum rotates.

In another illustrated aspect of the claimed subject matter, the apparatus further includes a take up unit operable to adjust the height of the drum above the floor of the housing.

In another aspect of the claimed subject matter, the apparatus includes a plurality of charged rotatable drums. The drums are positioned adjacent to one another such that the drum axes are parallel and a predetermined distance exists between adjacent drum outer surfaces. A nonconductive scraper head is provided for each drum to remove collected material from each drum outer surface.

In another aspect of the claimed subject matte, the apparatus includes a plurality of horizontally spaced disks rotatable about a common axis within a housing. The disks are charged to collect contaminants from the oil-based fluid in the housing while the housing has an opposing charge to create an electric field between the housing and the disks. The scraper is formed to have a plurality of tines extending between the disks to remove contaminants from the disks.

In another aspect of the claimed subject matter, the apparatus includes a plurality of horizontally spaced disks rotatable about a common axis within a housing. Plates are alternatingly placed between the spaced disks. The disks are charged to collect contaminants from the oil-based fluid in the housing while the plates have an opposing charge to create an electric field between each disk and the adjacent plates. The plates are configured to extend beyond the common axis without contacting it. The scraper is formed to have a plurality of tines extending between the disks to remove contaminants from each side of each disk.

In another aspect of the claimed subject matter, a method for purifying an oil-based fluid stream includes directing a continuous stream of contaminated oil-based fluid through an electrically charged housing, adjusting the height of an oppositely charged drum above the housing floor, rotating the drum to remove contaminants from the stream, scraping the contaminants from the drum, and receiving a purified fluid stream outside of the housing.

In another aspect of the claimed subject matter, a method for purifying a batch of oil-based fluid includes closing an outlet valve and opening an inlet valve to direct a batch of contaminated oil-based fluid into an electrically charged housing, closing the inlet valve to segregate the batch of contaminated fluid, adjusting the height of an oppositely charged drum above the housing floor such that the drum outer surface contacts the batch of contaminated fluid in the housing, rotating the drum to remove contaminants from the stream, scraping the contaminants from the drum, and opening the outlet valve to provide a purified batch of oil-based fluid outside of the housing.

Other aspects and advantages of the claimed subject matter will be apparent from the following description and the appended claims.

BRIEF DESCRIPTION OF THE DRAWINGS

FIG. 2 is a front view of the housing.

FIG. 3 is a side view of the housing.

DETAILED DESCRIPTION

Figure 1:
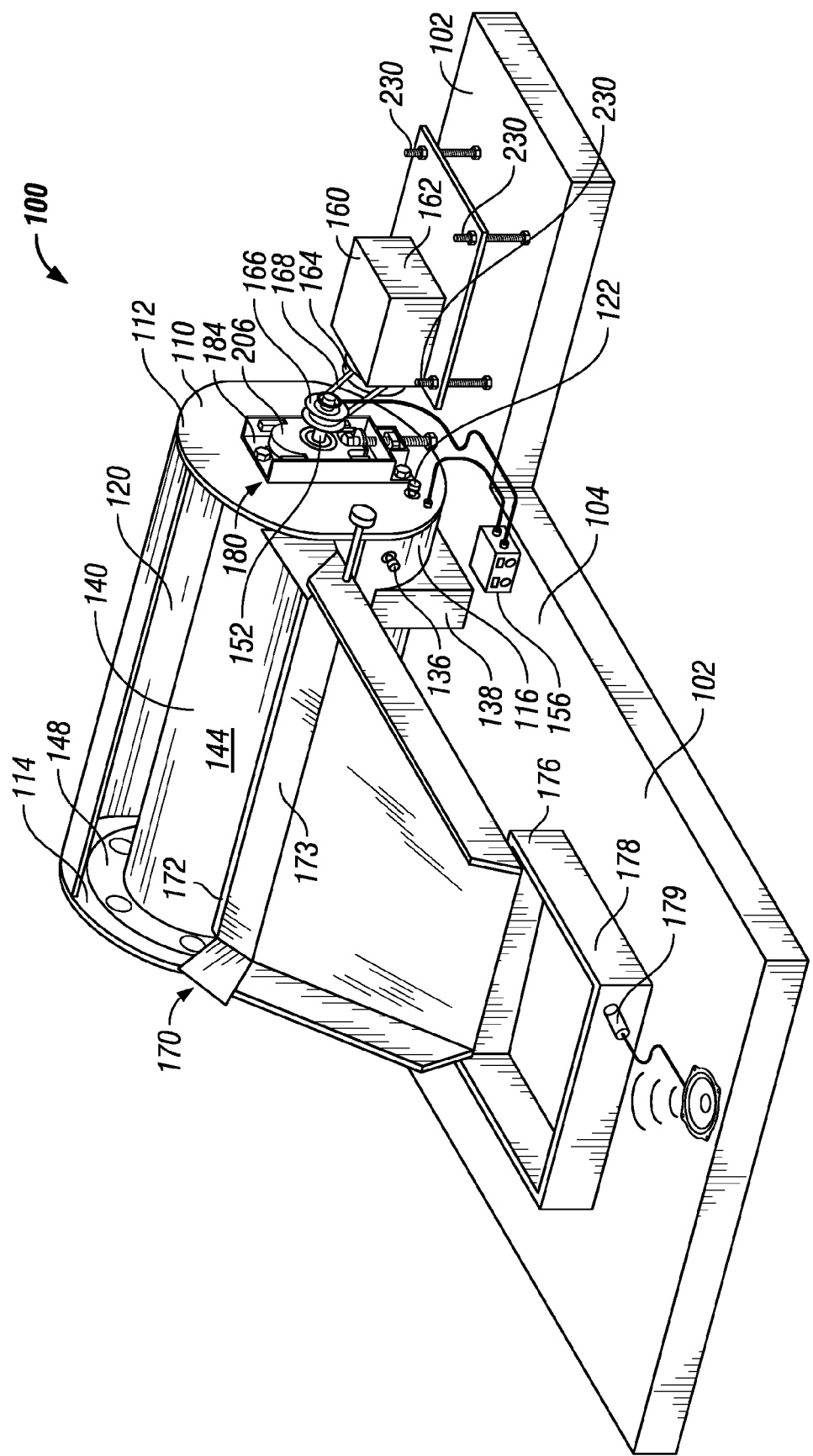
FIG. 1 is a perspective view of an embodiment of the electrophoresis apparatus.

The claimed subject matter relates to an apparatus and method for purifying an oil-based fluid using electrophoresis. Referring to FIG. 1, the apparatus 100 for purifying an oil-based fluid includes a housing 110 within which a drum 140 is rotatingly retained, a means for rotating the drum 160, and a scraper head 170.

The structure of the housing 110, shown in FIG. 2, includes two side walls 112, 114 between which a housing floor 116 extends. A splash guard 120 may extend upward from the housing floor 116 around the drum 140 (shown in FIG. 1). An inlet 122 is present through a first side wall 112 and an outlet 126 is present through a second side wall 114. In practice, the inlet 122 and the outlet 126 are serially aligned with other fluid handling devices (not shown) through which drilling fluid 106 (shown in FIG. 4) may be directed.

The first side wall 112 may be seen in FIG. 3. The second side wall 114 is a mirror image of the first side wall 112, with the inlet 122 on the first side wall 112 being replaced with the outlet 126 (shown in FIG. 2) on the second side wall 114. A slot 130 may be present through both first and second side walls 112, 114. As discussed in more detail below, the presence of a slot 130 will permit the height, known as the drum height 142 (shown in FIG. 4), between the drum 140 (shown in FIG. 4) and the housing floor 116 (shown in FIG. 4) to be adjusted.

Figure 4:
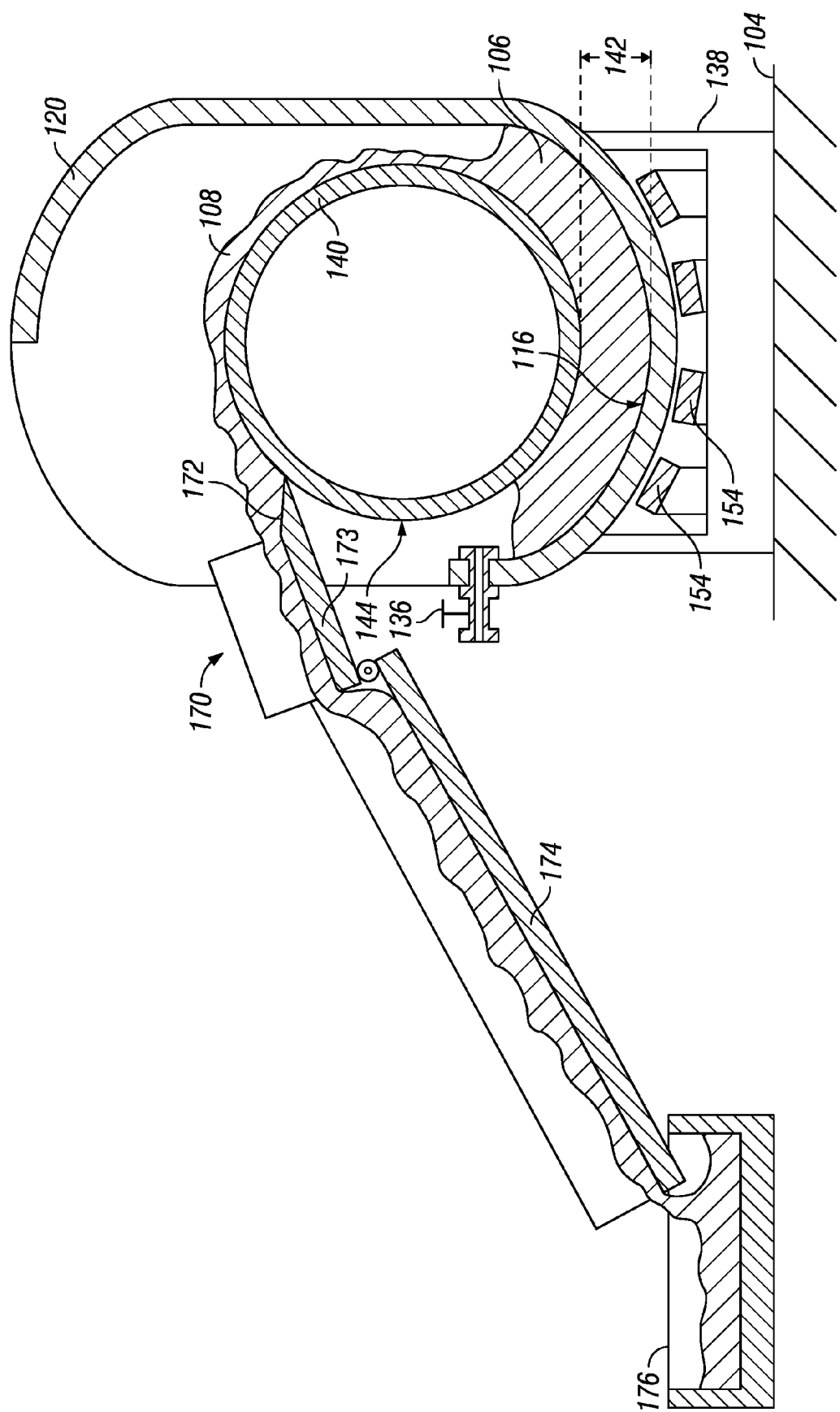
FIG. 4 is a cutaway side view of the electrophoresis apparatus.
Figure 5:
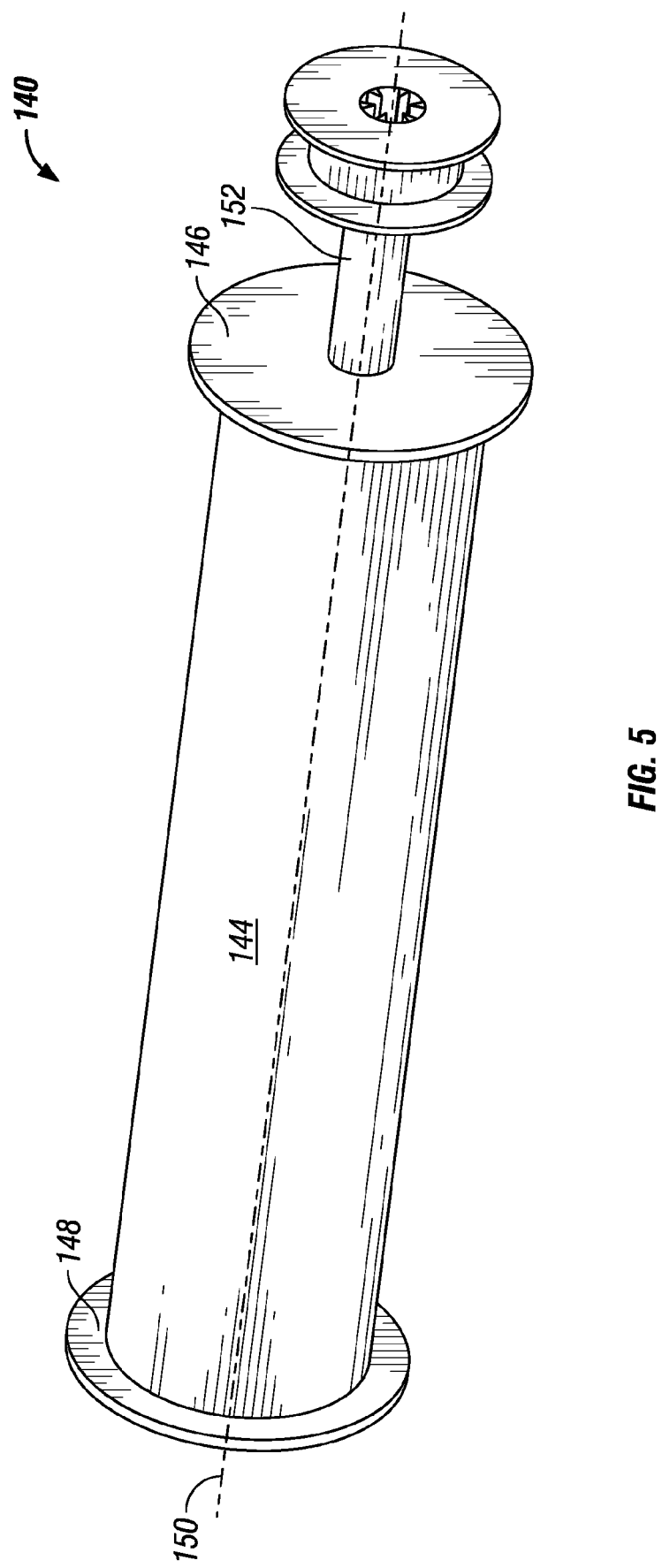
FIG. 5 is a perspective view of the drum.

As depicted in FIG. 5, the drum 140 has a drum outer surface 144 extending between drum ends 146, 148 and is cylindrical about a drum axis 150. Referring to FIGS. 1 and 4, each drum end 146, 148 will be retained such that the drum outer surface 144 is a drum height 142 from the housing floor 116. Each drum end 146, 148 may be retained by the respective housing side wall 112, 114 (shown in FIG. 1) provided that there is insulated contact between the drum end 146, 148 and the housing wall 112, 114. Alternatively and preferably, the drum 140 is retained at each drum end 146, 148 by a take up unit 180 (shown in FIG. 1), described in detail below, which allows adjustability of the drum height 142.

As shown in FIG. 4, the housing floor 116 is preferably shaped to complement the drum outer surface 144 while directing the contaminated fluid 106 along its length 118 (shown in FIG. 2) from the inlet 122 to the outlet 126. The complementary shape of the housing floor 116 ensures that all of the fluid 106 directed between the housing 110 and the drum 140 is within range of the drum height 142. Further, there are no corners for accumulation of solids or other foreign objects.

The means for rotating the drum 160 includes motors, cranks, or any other power generating means in combination with gears, belts, flywheels, or any other energy-transferring means. The preferred embodiment, shown in FIG. 1, includes a variable speed motor 162 with a drive wheel 164. An axle 152 extends from each drum end 146, 148 to an axle wheel 166. Rotation from the motor 162 is transmitted to the drive wheel 164, which pulls the belt 168. The belt 168 rotates the axle wheel 166. The axle 152 is keyed or affixed to the axle drive wheel 166 so that as the axle wheel 166 is rotated by the belt 168, the axle 152 is also rotated. The drum 140 is rotated such that a point on the drum outer surface 144 is subjected to the contaminated fluid stream 106 where it attracts contaminants 108, rotated toward the splash guard 120 and rotated past the scraper head 170 before being rotated back into the contaminated fluid stream 106.

Referring to FIGS. 1 and 4, the scraper head 170 preferably contacts the drum outer surface 144 along its downward rotation. Although the scraper head 170 may be positioned such that it contacts the drum outer surface 144 along its length, a majority of the accumulated contaminants 108 may be removed from the drum outer surface 144 by positioning the scraper head 170 less than a predetermined maximum distance (not shown) from, but not contacting, the drum outer surface 144. The scraper head 170 may be replaceable and include a scraper 172 and a flow director 173. The scraper 172 is preferably made from a plastic or other nonconductive composite material that will resist wear while being of sufficient strength to scrape material from the drum outer surface 144 without deforming. The scraper 172 may be attached to the flow director 173 or the scraper 172 and flow director 173 may be formed as a single unit.

Accumulated contaminants 108 are removed from the drum outer surface 144 by the scraper 172. After removal from the drum outer surface 144, the flow director 173 may guide contaminants 108 toward a collection area 176 or processing area (not shown), away from the drum 140 and housing 110. A slide 174 or other conveyance means (not shown) may be used to move contaminants to the collection area 176.

Figure 6:
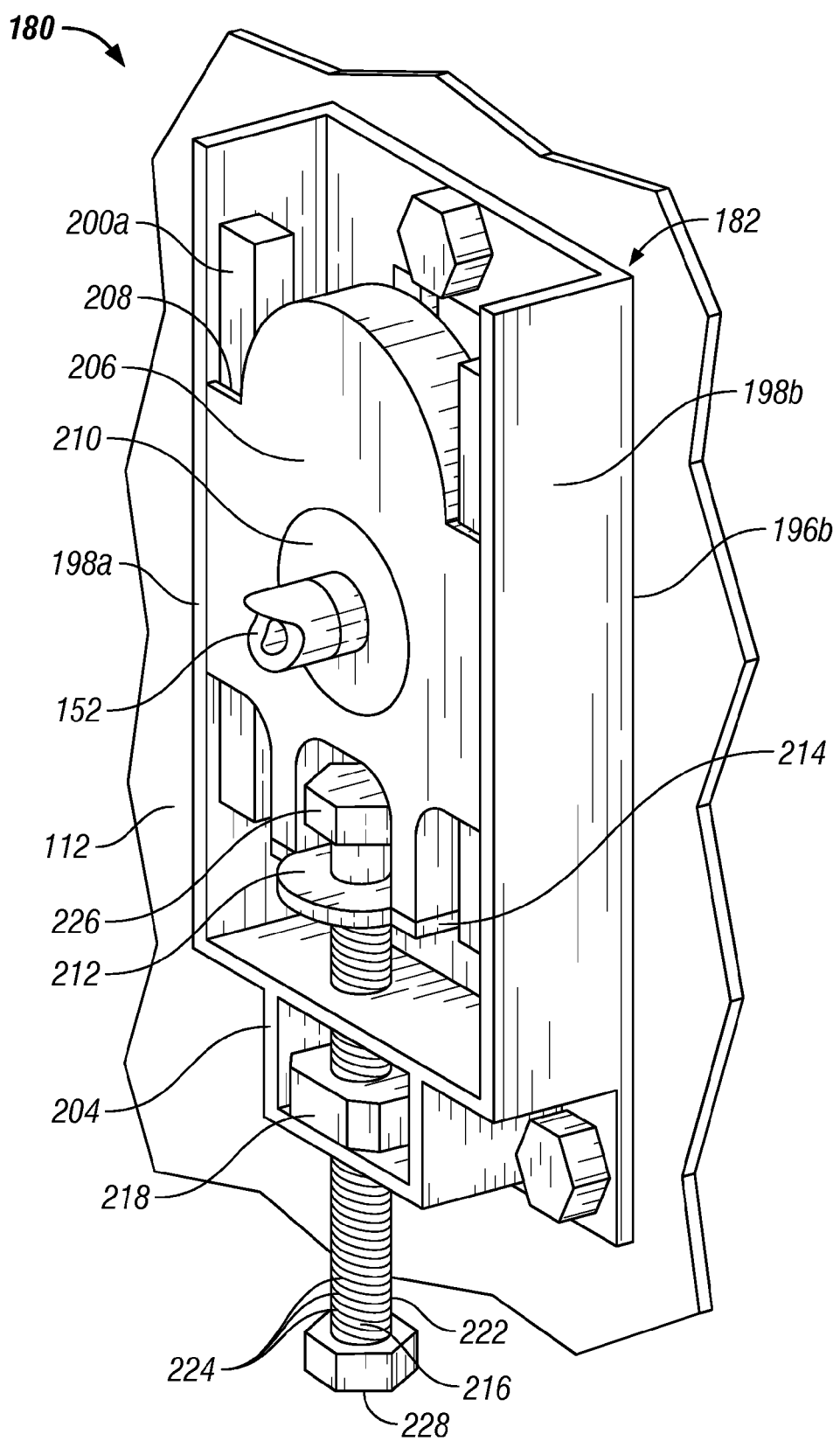
FIG. 6 is a perspective view of the take up unit.
Figure 7:
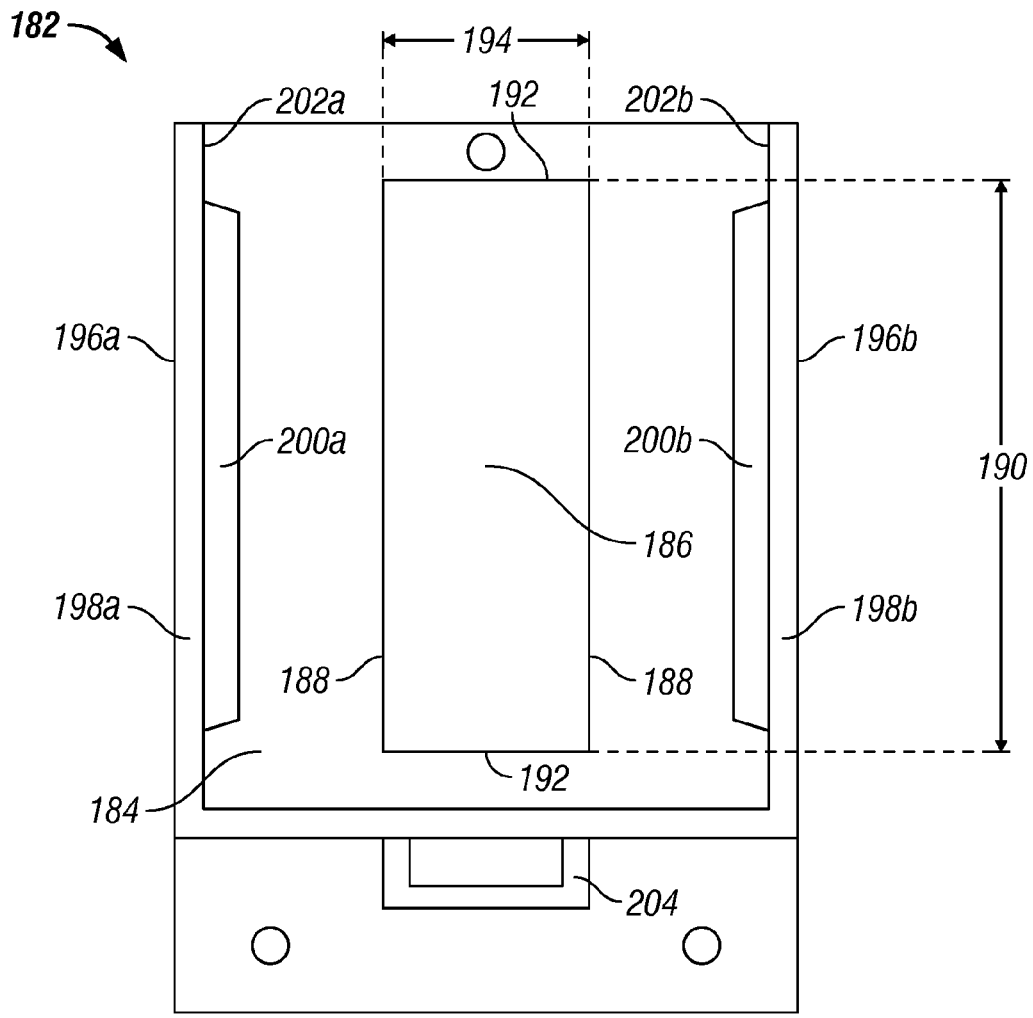
FIG. 7 is a front view of the take up unit bracket.

As referred to earlier, a take up unit 180, depicted in FIG. 6, may be included to adjust the drum height 142 between the drum outer surface 144 and the housing floor 116. When included, a take up unit 180 is placed on each of the first and second side walls 112, 114. The structure of the take up unit 180 will be discussed in the context of the first side wall 112, and those of skill in the art will appreciate that the same structure is present for the take up unit 180 on the second side wall 114. The take up unit 180 includes a bracket 182, a drum support 206 and a height adjuster 216.

The bracket 182 has a mounting plate 184 having a bracket slot 186 through which the axle 152 (shown in FIG. 6) will extend. The bracket slot 186 is defined by two opposing slot sides 188 and two opposing slot ends 192. The slot sides 188 have a side length 190 and the slot ends 192 have an end length 194, wherein the end length 194 is less than the side length 190. The mounting plate 184 is affixed to the side wall 112 (shown in FIG. 6) of the housing 110 such that the bracket slot 186 and the slot 130 in the side wall 112 are coaligned.

Two guide members 198a, 198b are located along opposing sides 196a, 196b of the mounting plate 184 and extend outward from the mounting plate 184 and housing side wall 112. The slot sides 188 are aligned with the guide members 198a, 198b. A pair of guide rails 200a, 200b extend along facing surfaces 202a, 202b of the guide members 198a, 198b.

A height adjuster retainer 204 is located near one of the slot ends 192 and extends outward from the mounting plate 184. As will be discussed, the height adjuster retainer 204 holds an internally-threaded datum member 218 (shown in FIG. 6) in a fixed location.

Referring again to FIG. 6, the drum support 206 has a pair of opposed guide grooves 208, which interface with the guide rails 200. The guide grooves 208 slide over the guide rails 200a, b so that the drum support 206 is slidingly retained between the guide members 198a, b. A bearing surface 210 retains the rotatable axle 152. A guide ring 212 is located at the lower end 214 of the drum support 206 and provides an interface with the height adjuster retainer 204.

Figure 8:
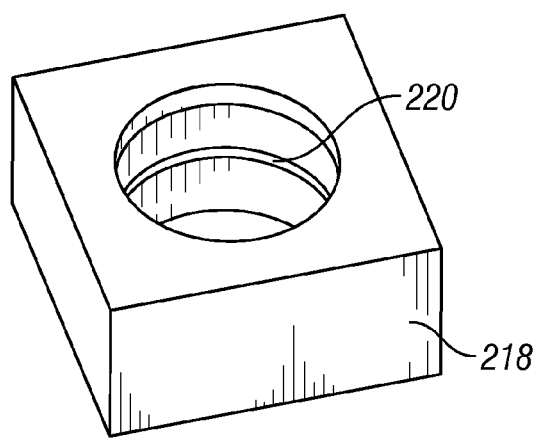
FIG. 8 is a perspective view of the threaded datum member.

The height adjuster 216 includes a threaded adjustment member 222 and the datum member 218. The datum member 218 is retained within the height adjuster retainer 204 such that it is held with only nominal side-to-side and rotational movement possible. The threaded adjustment member 222 has external threads 224 which interface with the internal threads 220 (shown in FIG. 8) on the datum member 218 to retain the threaded adjustment member 222 in a predetermined location. A first end 226 of the adjustment member 222, guided by the guide ring 212, contacts the drum support 206. A second end 228 of the adjustment member 222 is located outside of the mounting bracket 182 where it is accessible to an operator wanting to adjust the drum height 142.

When an operator wants to raise or lower the drum 140, the second end 228 of the adjustment member 222 is rotated in the desired direction. Rotation in a first direction causes the adjustment member 222 to move linearly in a first direction with respect to the fixed location of the datum member 218. The drum support 206, resting on the adjustment member 222, is raised or lowered by the linear movement of the adjustment member 222. Preferably, the adjustment members 222 on the take up units 180 on each side wall 112, 114 are adjusted so that the drum height 142 is uniform along the length 118 of the housing floor 116. As will be discussed below, the take up unit 180 electrically isolates the drum 160 from the housing 110.

Referring again to FIG. 1, motor height adjusters 230 are located on the skid on which the motor 162 is located. Proper tension of the belt 168 between the axle wheel 166 and the drive wheel 164 is necessary to ensure that the motor 162 efficiently rotates the drum 140. Improper belt tension may cause the belt 168 to slip or break, depending upon whether the belt is under too little, or too much, tension.

The housing 110 and the motor 162, when included, may be mounted on skids 102 for ease of handling and integrating into existing fluid processing systems.

In practice, tanks (not shown) or processing devices (not shown) are fluidly connected to the inlet 122 and the outlet 126 of the housing 110. Turning to FIG. 2, an inlet valve 124 may be used to regulate or stop fluid flow through the inlet 122 into the housing 110. An outlet valve 128 may be used to regulate or stop fluid flow through the outlet 126 of the housing 110.

Referring again to FIGS. 1 and 4, to separate the contaminants 108 from the fluid 106, the contaminated fluid 106 will be subjected to an electrical field caused by opposing electrical charges applied to the housing 110 and the drum 140. The drum 140 and the housing 110 must be formed from a conductive material. As is discussed in detail below, certain interfaces between the drum 140, housing 110, and ground 104, therefore, must be insulated to insure the integrity of the electrical field.

Referring to FIGS. 1 and 5, the axle 152, which is affixed to the drum end 146, 148, must be insulated from the housing side walls 112, 114. If a take up unit 180 is included, the housing side wall 112, 114 may be in electrical contact with the mounting plate 184, which may further be in electrical contact with the drum support 206. Thus, the bearing surface 210 (shown in FIG. 6) of the drum support 206 must insulate the axle 152 from the drum support 206 to ensure that the electrical field between the drum 140 and the housing 110 is maintained. As the axle 152 is operable by the motor 162, any contact between the axle 152 and the motor 162 should also be insulated. As such, it may be preferable to fabricate the axle wheel 166 from a nonconductive material.

The housing 110 should be insulated from the ground 104, as shown in FIGS. 1 and 4. To accomplish this, the housing 110 may be retained on one or more pedestals 138 made from a non-conductive material.

The scraper 172 may contact the drum outer surface 144. The flow director 173, to which the scraper 172 may be attached or with which the scraper 172 may be formed, may contact the slide 174 or other conveyance means (not shown). The slide 174 or conveyance means may, in turn, contact ground 104 or the housing 110. Through such contact, the difference between the charge applied to the drum 140 and the charge applied to the housing 110 may be lost, resulting in a loss of the electrical field formed between them through which the contaminated fluid 106 is directed. To provide insulated contact between the drum 140 and the scraper head 170, the scraper 172 may be made from a nonconductive material.

Continuing to refer to FIGS. 1 and 4, the drum height 142 should be adjusted so that the drum outer surface 144 is in contact with the fluid 106 along the housing floor 116. One or more over flow valves 136 may be included on the housing 110 to ensure that the fluid 106 does not overflow the housing 110 in an uncontrolled flow.

A negative charge is applied to the drum 140 and a positive charge is applied to the housing 110. The negative charge attracts the contaminants 108 in the fluid 106. The contaminants 108 migrate toward the drum 140 and are held against the drum outer surface 144 by the electrical charge.

Once an electrical charge is applied to housing 110 and an opposite electrical charge is applied to the drum 140, the drum 140 should be rotated to provide a clean surface upon which additional contaminants may collect and to extract collected contaminants from the fluid. The drum 140 may be rotated by any means, such as any type of motor 162 or a manual crank (not shown). In the preferred embodiment, a motor 162 is used to rotate the drum 140. The motor 162 may adjustable to vary the rotational speed of the drum 140.

The contaminants 108 collected on the drum outer surface 144 are removed by a scraper 172, which contacts the drum outer surface 144 as it begins its downward rotation. The contaminants 108 may then be directed to a collection area 176 away from the drum 140 and housing 110 by a slide 174. The collection area 176 may include boxes 178 having sensors 179 to alert an operator (not shown) when a box 178 is nearly full. Alternatively, the collection area 176 may include a conveyor (not shown) or other means to direct the contaminants 108 away from the apparatus 100.

The ultra fine contaminants present in the oil-based fluid may be collected as the fluid flows through the housing 110 or as batches of fluid are periodically contained within the housing 110 and released. To collect contaminants 108 from a batch of fluid 106, the outlet valve 128 is closed and the inlet valve 124 is opened to direct contaminated fluid 106 into the housing 110. After the housing 110 is adequately filled, the drum 140 may be adjusted to contact the contaminated fluid 106. The means for rotating the drum 160 is powered to provide rotation to the drum 140 and opposing electrical charges are applied to the housing 110 and the drum 140. The ultra fine contaminants 108 are removed from the fluid when no further contaminants 108 are detected on the drum outer surface 144.

Alternatively, the contaminated oil-based fluid 106 may be directed through the housing 110 in a controlled flow. The contaminated fluid 106 is directed through the inlet 122 and the outlet valve 128 is opened such that the fluid will egress the housing 110 through the outlet 126. The flow should be controlled such that the fluid has adequate exposure to the electrical field between the housing 110 and the drum 140 for contaminants 108 to collect on the drum outer surface 144.

Figure 9:
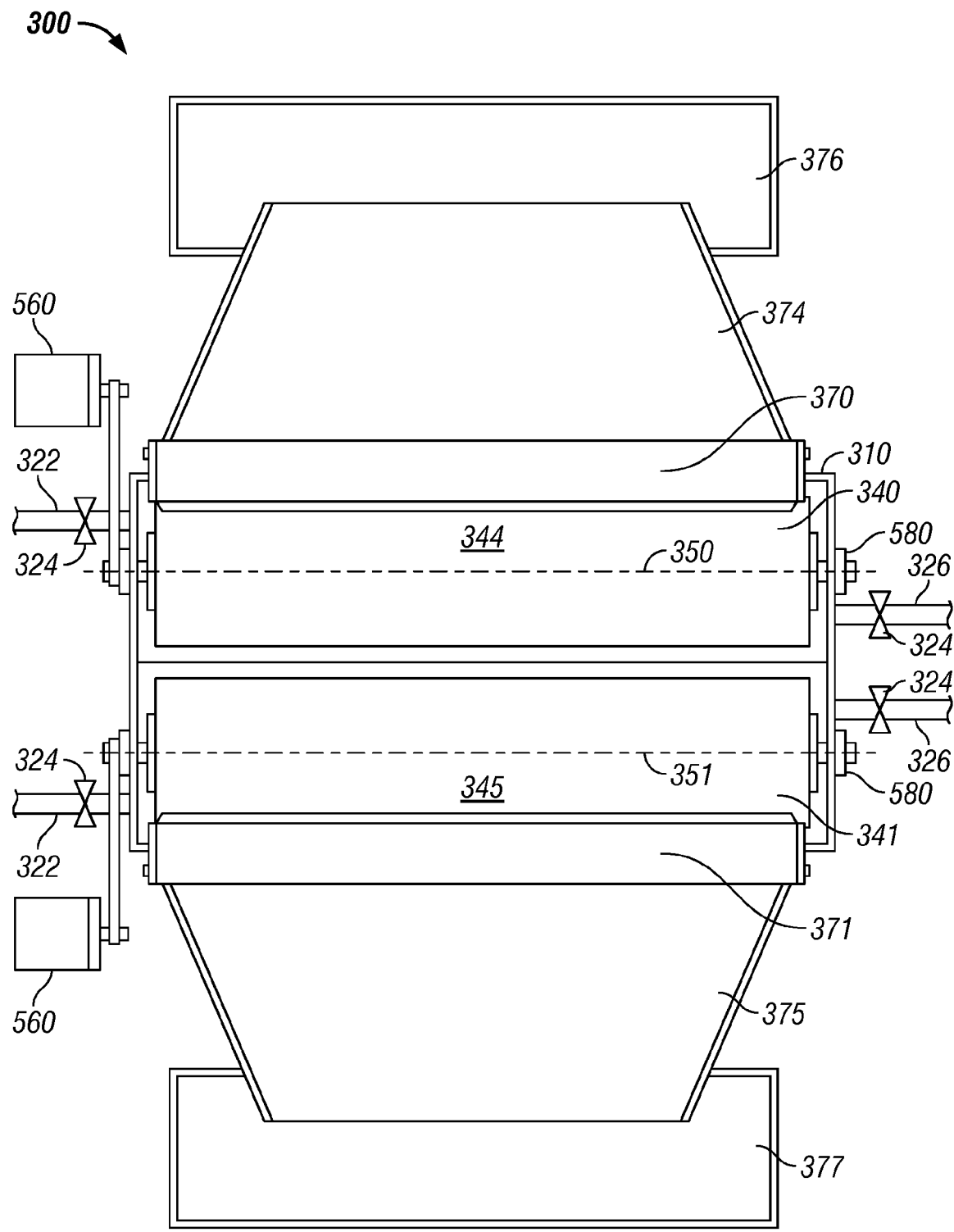
FIG. 9 is a top view of a first alternative embodiment of the electrophoresis apparatus.
Figure 10:
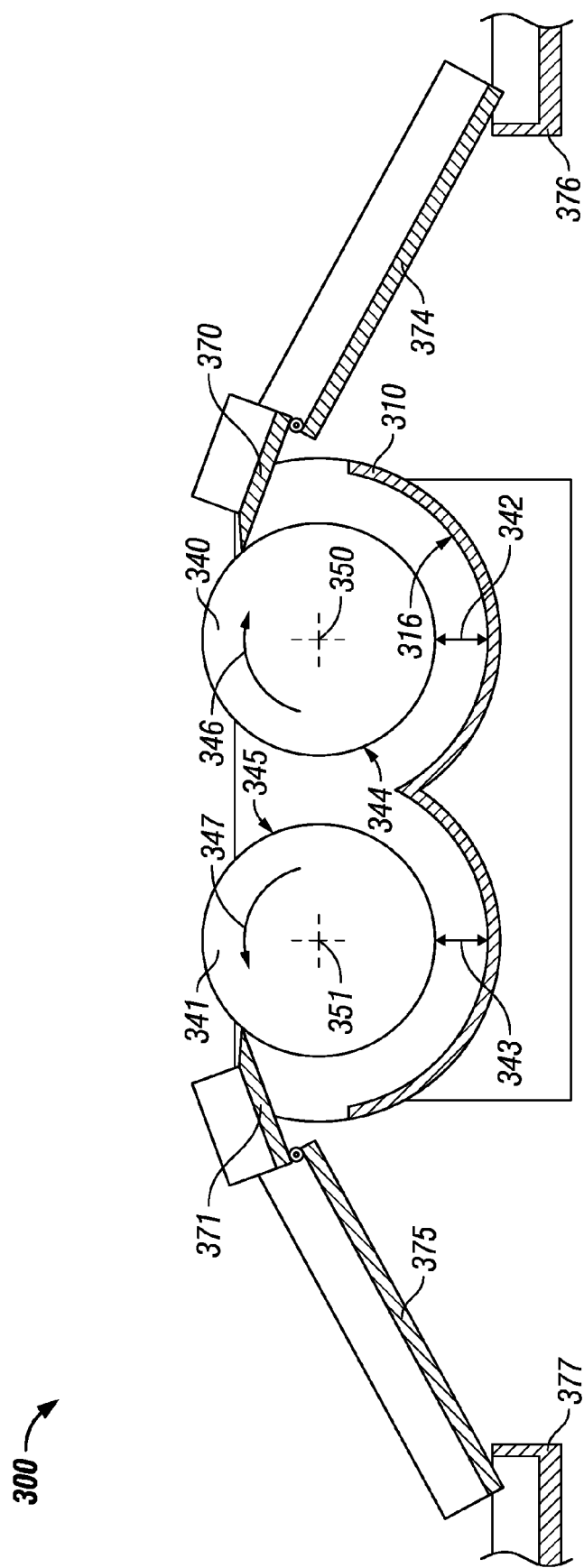
FIG. 10 is a cutaway side view of a first alternative embodiment of the electrophoresis apparatus.

Referring to FIGS. 9 and 10, a first alternative embodiment of the apparatus 300 is depicted. The apparatus 300 has a plurality of rotatable drums 340, 341, which are positioned adjacent to one another such that the drum axes 350, 351 are parallel. The housing 310 accommodating the multiple drums 340, 341 has a housing floor 316 preferably shaped to substantially complement the drum outer surfaces 344, 345. Thus, fluid directed between the housing floor 316 and the drums 340, 341 is within the range of the drum heights 342, 343.

The rotational direction of each drum 340, 341 is depicted by arrows 346, 347, shown in FIG. 10. As can be seen, the drums 340, 341 rotate in opposing directions. Each drum 340, 341 rotates such that an associated scraper head 370, 371, located on opposing sides of the housing 310, removes contaminants from the drum outer surface 344, 345 as the corresponding outer surface 344, 345 rotates downward. Each scraper head 370, 371 has an associated slide 374, 375 to direct the contaminants to respective collection boxes or areas 376, 377.

Multiple inlets 322 having a valve 324 may be used to direct fluid into the housing 310. When a stream of contaminated fluid is to be treated by the apparatus 300, the inlets 322 are preferably located near opposite sides of the housing 310 to maximize contact with the charged drum outer surface 344, 345. Each of the inlets 322 and outlets 326 include a valve 324 to regulate flow of a contaminated fluid stream or to stop the fluid stream for batch processing.

Figure 11:
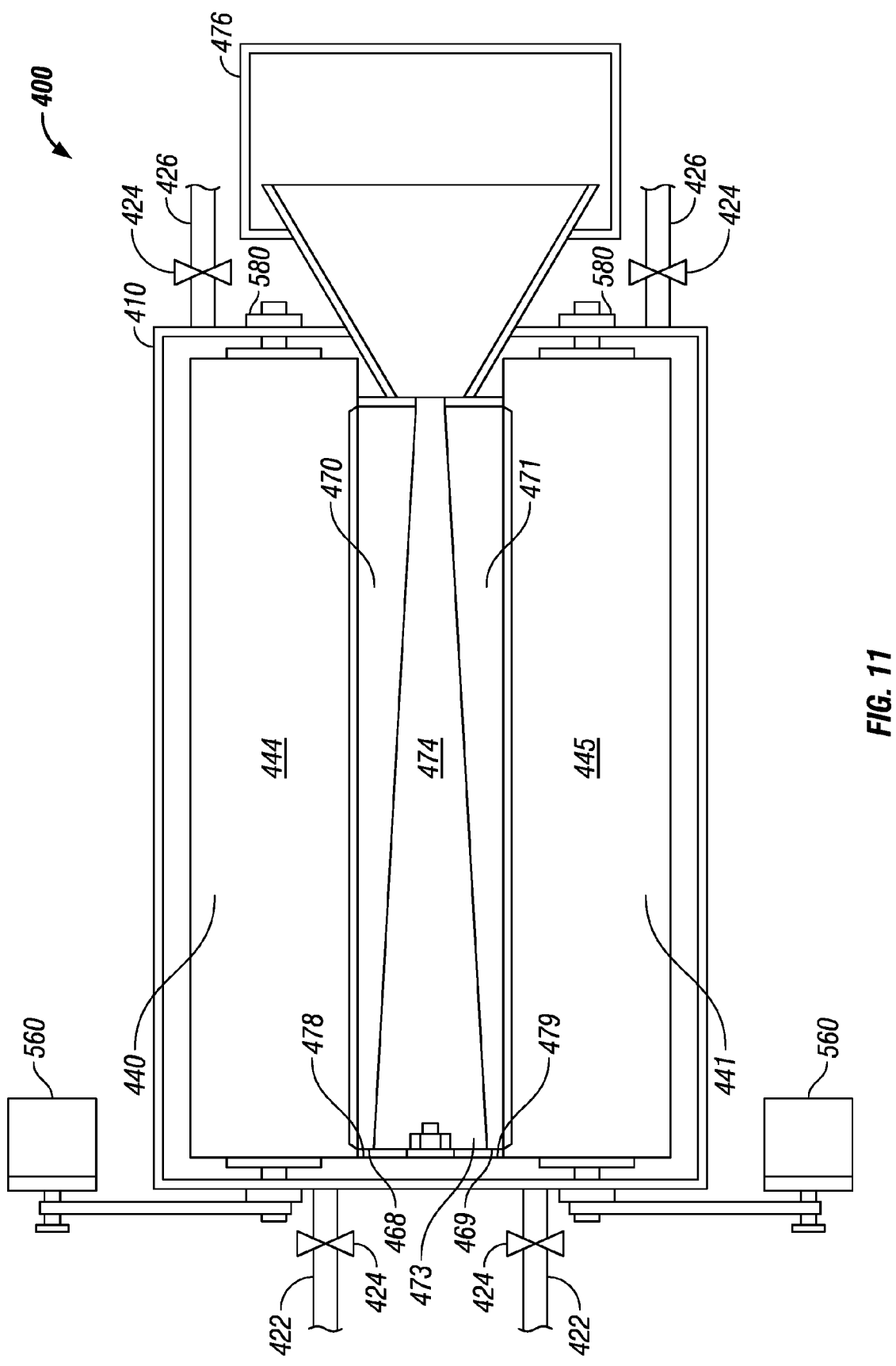
FIG. 11 is a top view of a second alternative embodiment of the electrophoresis apparatus.
Figure 12:
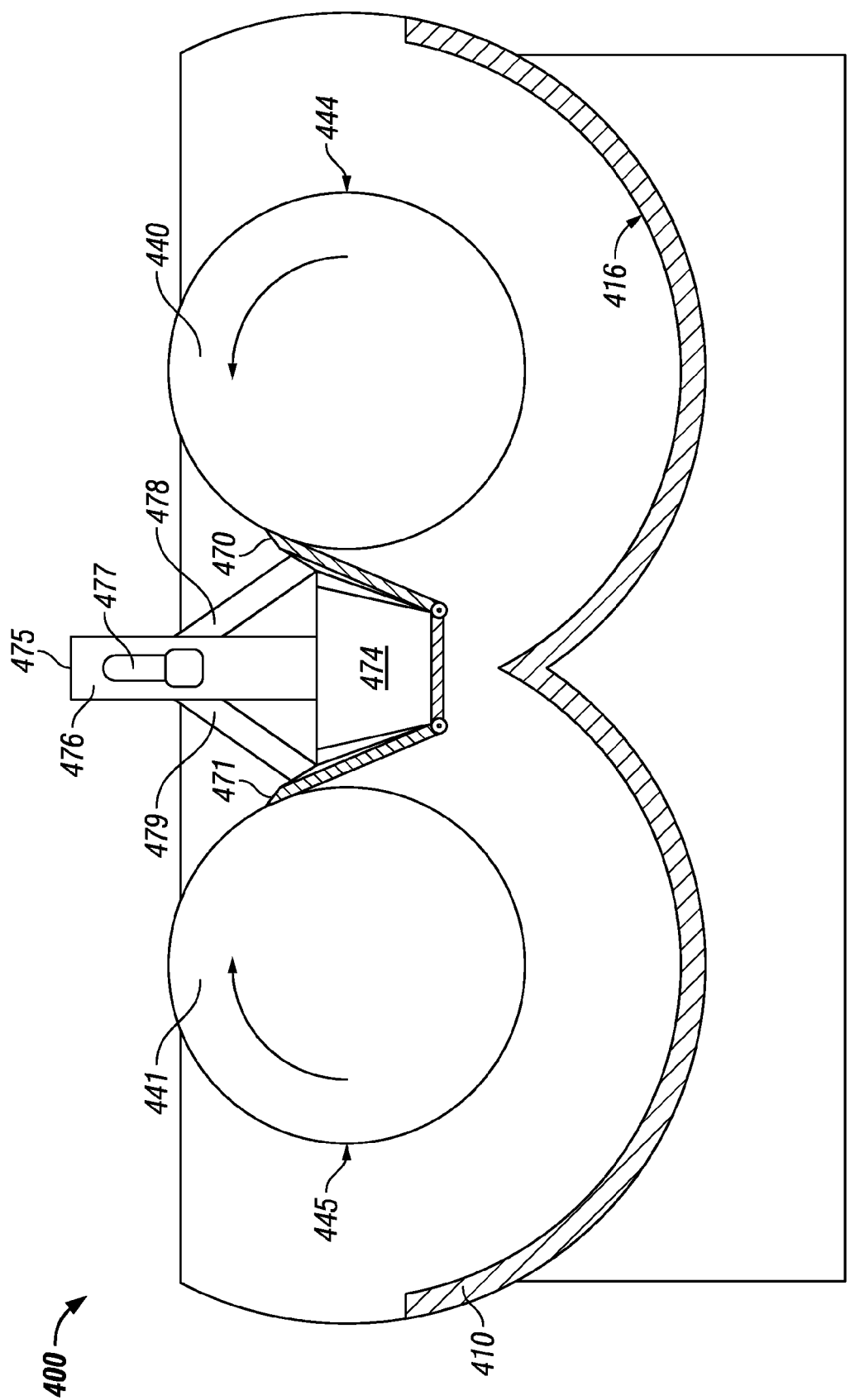
FIG. 12 is a cutaway side view of a second alternative embodiment of the electrophoresis apparatus.

A plurality of drums 440, 441 is used again in another alternative embodiment 400, depicted in FIGS. 11 and 12. In this embodiment, the drums 440, 441 rotate in opposing directions such that scraper heads 470, 471, located between the drums 440, 441, remove contaminants from the drum outer surfaces 444, 445 as the drums rotate toward each other. The scraper heads 470, 471 direct contaminants toward a common slide 474. The slide 474 may be slanted slightly downward, utilizing gravity to direct the contaminants to a collection area 476.

Each scraper head 470, 471 may be pivotally attached to the common slide 474. Thus, as the drums 440, 441 are raised or lowered, the scraper heads 470, 471 may be adjusted to maintain contact with the drum outer surfaces 444, 445. The position of the scraper heads 470, 471 may be secured by an adjusting mechanism 475. The adjusting mechanism 475 may include a positioning rod 476 having a slot 477 therethrough. The positioning rod 476, located at an end 473 of the slide 474, is flanked by linkages 478, 479. The linkages 478, 479 are pivotally attached to a corresponding end 468, 469 of each scraper head 470, 471. The linkages 478, 479 may be secured at a particular point along the length of the slot 477, resulting in a desired angular location of the scraper heads 470, 471.

The housing 410 in the second alternative embodiment 400, has a housing floor 416, preferably shaped to substantially complement shape of the drum outer surfaces 444, 445. Multiple inlets 422, having a valve 424 may be included through the housing 410 to direct fluid into the space between the housing floor 416 and the drums 440, 441. When a stream of contaminated fluid is to be treated by the apparatus 400, the inlets 422 are preferably located such that fluid initially is directed toward the area between the drums 440, 441. The complementary shape of the housing floor 416 serves to direct the fluid flow such that contact with the charged drum outer surface 444, 445 is maximized. Each of the inlets 422 and outlets 426 include a valve 424 to regulate flow of a contaminated fluid stream or to stop the fluid stream for batch processing.

Figure 13:
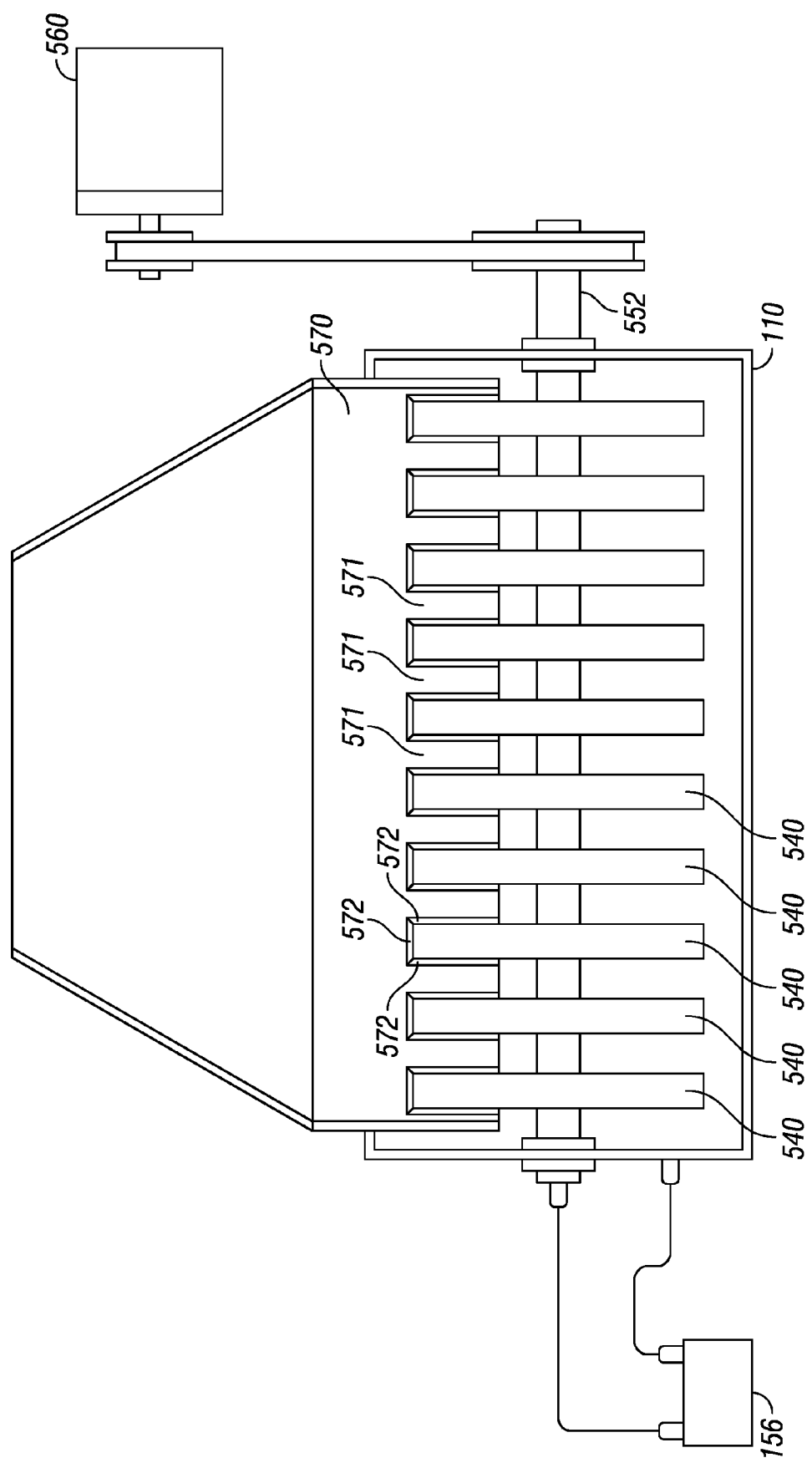
FIG. 13 is a top view of an alternative embodiment of the electrophoresis apparatus.

In a third alternative embodiment, shown in FIG. 13, a plurality of disks 540 may be spaced apart and retained on a common axle 552 in place of drum 140. A first charge may be applied to the disks 540 through axle 552 while an opposing charge is applied to housing 110. Contaminants collect on disks 540. As disks 540 rotate, contaminants from the fluid are adhered to the sides and end of each disk 540. A scraper head 570 is used to remove the contaminants from each disk 540. Scraper head 570 includes a plurality of tines 571 positioned between disks 540 to remove collected contaminants from the disks 540. A nonconductive lip 572 surrounds each disk 540 to insulate the charged disks 540 from scraper head 570.

Figure 14:
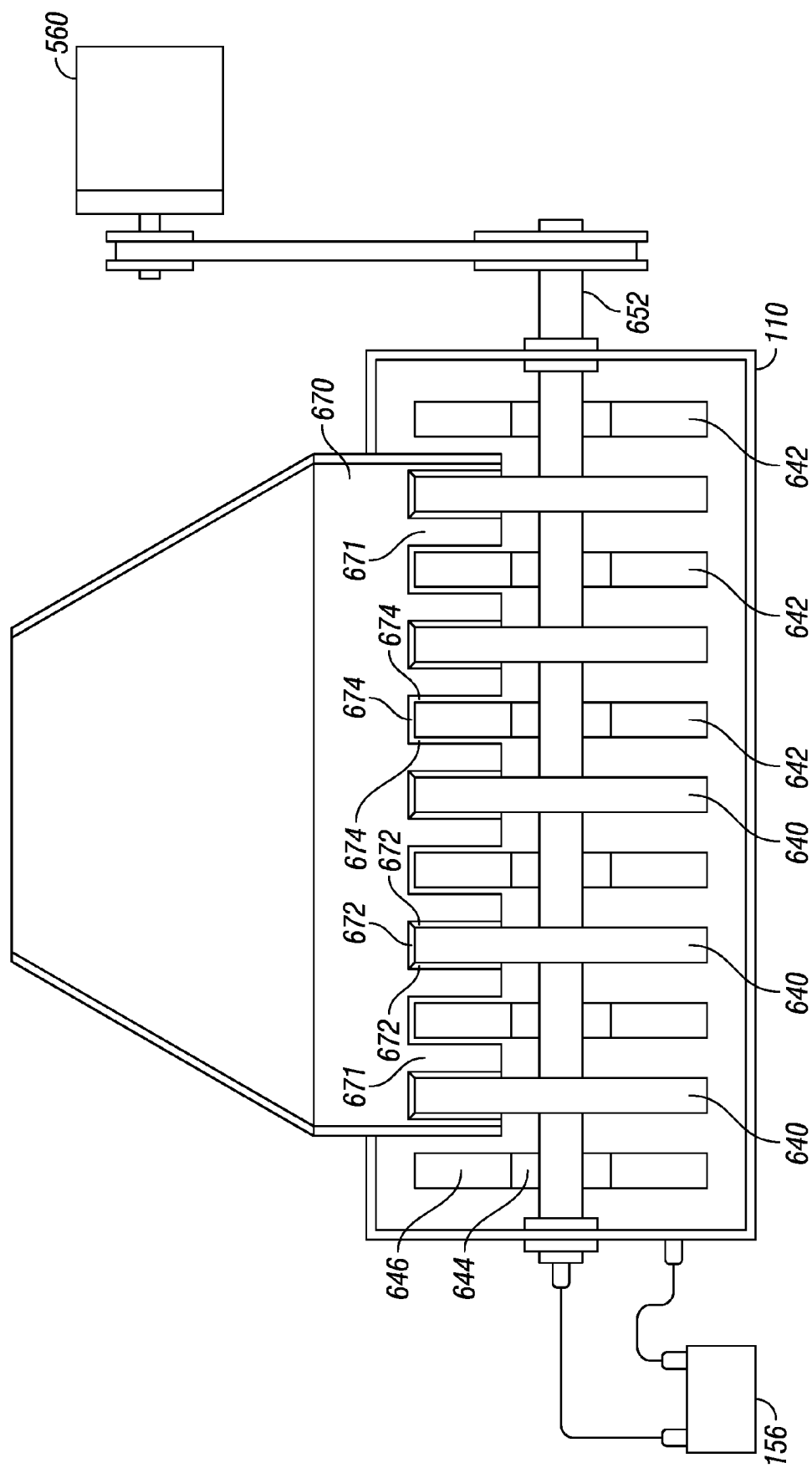
FIG. 14 is a top view of an alternative embodiment of the electrophoresis apparatus.

As depicted in FIG. 14, in a fourth alternative embodiment, a plurality of disks 640 may be spaced apart and retained on a common axle 652 in place of drum 140. A plurality of plates 642 are placed in alternating positions with the disks 640. The plates 642 are configured with a notch 644 in a top surface 646 to avoid contact with axle 652. Disks 640 are given a first charge while plates 642 are given an opposing charge to create an electric field between each disk 640 and adjacent plate 642. Contaminants in the fluid collect on disks 640. As disks 640 rotate, contaminants from the fluid adhere to the sides and end of each disk 640. A scraper head 670 includes a plurality of tines 671 positioned between disks 640 and plates 642. A nonconductive lip 672 surrounds each disk 640 to insulate the charged disk 640 from scraper head 670. A gap 674 is present between each tine 671 and each plate 642.

In each embodiment described, housing 110 may include a means for heating 154, shown in FIG. 4, to heat housing floor 116. It has been found that as the viscosity of the contaminated fluid decreases, the collection of contaminants upon the drum outer surface 144 increases. Means for heating 154 may include heating elements beneath the housing floor 116, which should be of a heat-conductive material. Means for heating 154 may include other heating sources such as a hot oil bath.

Each embodiment described may also include a controller 156 operable to control the voltage between the drum 140 or disks 540, 640 and the housing 110 or plates 642. Increasing the voltage between the oppositely charged surfaces while maintaining the current at a constant amperage has been found to improve the performance of the drum 140 or disks 540 or 640 to collect contaminants from the fluid.

For each of the alternative embodiments described, at least one means for rotating the drums 560 is included. A single means for rotating the drums 560 may be used to rotate both drums 340, 341 or 440, 441 simultaneously. Alternatively, two separate means for rotating the drums 560 may be included to rotate each drum 340, 341 or 440, 441 independently of the other. As previously described, the means for rotating the drum 560 may include a motor, manual crank, or other mechanical rotational device.

Also, each of the alternative embodiments described may include take up units 580 at the interface between the housing 310 or 410 and each drum axle 352, 353 or 452, 453. As previously described each take up unit 580 may be used to raise or lower the respective drum 340, 341, 440 441 with respect to the housing floor 316 or 416.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for purifying an oil-based fluid comprising:
   an electrically charged housing having a housing floor and a plurality of walls containing a contaminated oil-based fluid;
   an oppositely charged rotatable cylindrical drum having a drum outer surface retained a drum height above the housing floor and contacting the contaminated oil-based fluid;
   a means for rotating the cylindrical drum while the cylindrical drum is contacting the contaminated oil-based fluid;
   a nonconductive scraper head contacting the drum outer surface to remove contaminants collected thereon while the cylindrical drum is rotating and contacting the contaminated oil-based fluid, wherein the scraper head is positioned between the contaminants to be removed from the drum outer surface and the housing;
   wherein the cylindrical drum can be selectively raised or lowered to adjust the drum height; and
   wherein the housing floor is shaped to complement the cylindrical drum.

2. The apparatus of claim 1 further comprising: a take up unit mounted to the
   housing and interfaced with the drum to selectively adjust the drum height.

3. The apparatus of claim 1, wherein the means for rotating the drum is adjustable to vary the rotational speed of the drum.

4. The apparatus of claim 3, wherein the means for rotating the drum is a motor.

5. The apparatus of claim 4 further comprising: a take up unit mounted to the housing and interfaced with the drum to selectively adjust the drum height; and a plurality of motor height adjusters selectively operable to raise and lower the motor.

6. The apparatus of claim 1, further comprising: a collection pan to receive contaminants.

7. The apparatus of claim 6, further comprising: a slide between the collection pan and the scraper head, wherein the slide directs contaminants from the scraper head to the collection pan.

8. The apparatus of claim 7 further comprising; a sensor operable to sense when a predetermined volume of contaminants has been collected in the collection pan.

9. The apparatus of claim 8, wherein the sensor further includes an alarm to signal when the predetermined volume of contaminants has been collected in the collection area.

10. The apparatus of claim 1 further comprising: at least one overflow valve in the housing, wherein the overflow valve is operable to prevent uncontrolled flow from the housing.

11. The apparatus of claim 10 further comprising: an inlet valve on the housing operable to regulate a flow of the fluid into the housing; and an outlet valve on the housing operable to regulate a flow of the fluid out of the housing.

12. The apparatus of claim 1 further comprising: a plurality of oppositely charged rotatable cylindrical drums, wherein each drum has a drum outer surface adjustably retained a drum height above the housing floor and contacting the contaminated oil-based fluid.

13. The apparatus of claim 1 further comprising: a means for heating the housing floor to decrease the viscosity of the fluid.

14. The apparatus of claim 1 further comprising: a controller operable to increase the voltage between the housing and the drum while maintaining a constant amperage.

15. An apparatus for removing contaminants from an oil-based fluid comprising:
    an electrically charged housing having a housing floor and a plurality of walls, wherein a contaminated oil-based fluid is contained within the walls and housing floor;
    a plurality of disks retained on an axle and oppositely charged to said housing, each disk having a disk outer surface retained a height above the housing floor and contacting the contaminated oil-based fluid;
    a means for rotating the disks while the plurality of disks are contacting the contaminated oil-based fluid;
    a scraper head including a plurality of tines located between the disks, wherein a nonconductive lip extends from each tine toward each disk to remove contaminants collected on each disk while the plurality of disks are rotating and contacting the contaminated oil-based fluid;
    wherein the axle can be selectively raised or lowered to adjust the height of the plurality of disks above the housing floor; and
    wherein the housing floor is shaped to complement the disk outer surface.

16. The apparatus of claim 15, further comprising: a plurality of electrically charged plates extending from the housing floor between each disk.

17. The apparatus of claim 15, further comprising: a means for heating the housing floor to decrease the viscosity of the fluid.

18. The apparatus of claim 17 wherein the means for heating the housing floor includes a heating element retained beneath the housing floor.

19. The apparatus of claim 15, further comprising: a controller operable to increase the voltage between the disks and the housing floor while maintaining a constant current.

20. A method for purifying a contaminated oil-based fluid comprising:
    directing a contaminated oil-based fluid into an electrically charged housing, wherein the housing has a housing floor;
    exposing the fluid to an electrical field between the electrically charged housing and an oppositely charged cylindrical drum disposed within the housing, wherein the housing floor is shaped to complement the cylindrical drum and the fluid is in contact with the housing floor and the cylindrical drum;
    selectively adjusting a position of the oppositely charged cylindrical drum so that the oppositely charged cylindrical drum is in contact with the contaminated oil-based fluid;

rotating the oppositely charged cylindrical drum while the cylindrical drum is contacting the contaminated oil-based fluid to remove contaminants adhered to the oppositely charged cylindrical drum from the contaminated oil-based fluid; and scraping the oppositely charged cylindrical drum with a nonconductive scraper head while the cylindrical drum is rotating and contacting the contaminated oil-based fluid to remove the contaminants from the oppositely charged cylindrical drum.

21. The method of claim 20, further comprising: adjusting the rotational speed of the drum.

22. The method of claim 20, wherein the directing step further comprises:

regulating a flow of contaminated fluid into the housing; and regulating a flow of purified fluid out of the housing.

23. The method of claim 20, further comprising: collecting the contaminants in a collection pan outside of the housing for disposal; sensing a predetermined volume of contaminants in the collection pan; and signaling when the predetermined volume of contaminants in the collection pan has been reached.

* * * * *